(12) United States Patent
Dykema

(10) Patent No.: US 6,908,298 B1
(45) Date of Patent: Jun. 21, 2005

(54) AIR-FUEL INJECTION SYSTEM FOR STABLE COMBUSTION

(76) Inventor: Owen W. Dykema, 3264 W. Normandy Ave., Roseburg, OR (US) 97470

( * ) Notice: Subject to any disclaimer, the term of this patent is extended or adjusted under 35 U.S.C. 154(b) by 9 days.

(21) Appl. No.: 10/283,824

(22) Filed: Oct. 29, 2002

Related U.S. Application Data

(60) Provisional application No. 60/335,087, filed on Oct. 30, 2001.

(51) Int. Cl.$^7$ .............................................. F23C 5/00
(52) U.S. Cl. ............................... 431/8; 431/11; 431/12
(58) Field of Search ........................ 431/8, 11, 12, 161, 431/175

(56) References Cited

U.S. PATENT DOCUMENTS

| | | |
|---|---|---|
| 4,012,189 A | 3/1977 | Vogt |
| 4,240,377 A * | 12/1980 | Johnson ..................... 122/4 D |
| 4,297,093 A | 10/1981 | Morimoto |
| 4,574,743 A * | 3/1986 | Claus ........................ 122/4 D |
| 4,657,504 A | 4/1987 | Akiyama |
| 5,180,300 A | 1/1993 | Hovis |
| 5,359,966 A | 11/1994 | Jensen |
| 5,411,394 A | 5/1995 | Beer |
| 5,460,513 A | 10/1995 | Flanagan |
| 5,846,067 A | 12/1998 | Nishiyama |
| 5,861,600 A | 1/1999 | Jensen |
| 5,944,507 A | 8/1999 | Feldermann |
| 5,961,312 A | 10/1999 | Sugiyama |
| 5,968,378 A | 10/1999 | Jensen |
| 5,984,667 A | 11/1999 | Philippe |
| 6,481,385 B1 * | 11/2002 | Gummel et al. ............ 122/4 D |

* cited by examiner

Primary Examiner—Alfred Basichas
(74) Attorney, Agent, or Firm—Thomas I. Rozsa; Tony D. Chen

(57) ABSTRACT

A method of and system for air-fuel injection for stable combustion in fuel combustors. It provides rapid mixing, continuous ignition and stable combustion under very fuel-rich and very fuel-lean conditions, mixtures that may even be beyond flammable limits. The rapid and intimate mixing are achieved by sizing, orienting and operating fuel and air orifices such that the reactant streams directly impinge, and the velocity head in the fluid in greater supply, in multiple orifices, is higher than the velocity head of the other reactant stream, by a factor of two (2) to five (5). The continuous ignition is achieved by preheating air to temperatures sufficiently high such that the resulting air-fuel mixture, after impingement and mixing, is above the fuel autoignition temperature. The stable combustion is achieved by designing the controlling orifice pressure drops and stream inertances to be higher for the reactant that is in short supply, relative to stoichiometric mixtures, such that a combustion chamber over-pressure causes the injected mixture ratio to move toward stoichiometric, in the direction of higher combustion temperatures and lower product densities. Under fuel-rich conditions the reactant in short supply is the air, and under fuel-lean conditions the reactant in short supply is the fuel. Appropriate ratios of these pressure drops and inertances are determined by dynamic analysis of potential modes of feed system-coupled combustion instability.

10 Claims, 1 Drawing Sheet

AIR-FUEL INJECTION SYSTEM FOR STABLE COMBUSTION

This application claims the benefit of provisional application 60/335,087 filed Oct. 30, 2001.

BACKGROUND OF THE INVENTION

1. Field of the Invention

The present invention generally relates to the field of improvement of combustion conditions for fuel combustors. More particularly, the present invention relates to the field of air-fuel injection systems for stable combustion.

2. Description of the Prior Art

The formation of NOx and SOx during combustion has been a long existing problem in commercial fuel combustors. Preventing the formation of NOx and SOx during combustion requires that initial combustion be very fuel-rich or very fuel-lean, sometimes beyond the rich and lean flammable limits. However, these approaches present difficult combustion conditions to maintain stable ignition and to avoid lift- or blow-off of the flame, and to prevent unstable response to or coupling with pressure fluctuations in the combustor.

To burn a fuel in air in a mixture beyond the flammable limit requires that the mixture be uniformly and intimately mixed and preheated to a temperature above the auto-ignition temperature. It also requires the combustion reactions to take place uniformly throughout the mixture, with no need or dependence on flame propagation. Conventional devices such as an igniter are useless. For example, the auto-ignition temperature with natural gas or methane fuels in air is about 1200° F., and the auto-ignition temperature with pulverized coal in air is about 500° F. Usually the air is strongly preheated, resulting in a final mixture that is above those temperatures.

In addition, when burning under very fuel-rich or fuel-lean conditions, the temperature and density of the combustion products vary significantly with the mixture ratio. Combustion chamber pressure perturbations change the injection system pressure drops and in turn, the total flow of fuel and air into the combustor is also changed. If the response of those flows to pressure perturbations is unequal, then the injected mixture ratio will vary as well. In such a case, the resulting combustion chamber pressure may reflect reductions not only in the total mass flows into the combustor but in the temperature and density of the combustion products as well. As a result, when burning very fuel-rich or fuel-lean, the probability of unstable feedback coupling is greatly increased.

Therefore, in order to protect against feed system coupled combustion instability, the fuel and air injection system must be designed such that the reactant in excess supply is more responsive to chamber pressure perturbations. The response to a chamber over-pressure would then be to change the mixture ratio in the direction of higher temperature, lower density combustion products. For example, when burning natural gas and air in very fuel-rich mixtures, gas is in excess supply and so the gas-side injection system should involve lower pressure drops and less inertance than the air-side injection system. In such an injector design an over-pressure will slow the gas flow more than the air flow, and the resulting mixture will be less fuel-rich (closer to stoichiometric), hotter and less dense, tending to compensate for the reduction in total flow.

Various prior art references have disclosed different injection schemes to mix one reactive fluid with another, for the purpose of combustion. The following are representative examples of such prior art:

1. U.S. Pat. No. 4,012,189 issued to Vogt on Mar. 15, 1977 for "Hot Gas Generator" (hereafter the "Vogt Patent") disclosed a hot gas generator for the production of hot combustion gases includes a cylindrical combustion chamber having an inner and an outer air conduit concentrically disposed thereabout. A fuel nozzle means is arranged at one longitudinal end of the cylindrical combustion chamber and an exhaust port is arranged at the other longitudinal end thereof. A baffle plate is disposed on the longitudinal end of the cylindrical combustion chamber on which the fuel nozzle means is arranged. Combustion air from a blower or the like flows through the outer air conduit into the inner conduit where it is heated by the cylindrical combustion chamber and then passes through openings in the baffle plate into the cylindrical combustion chamber.

2. U.S. Pat. No. 4,297,093 issued to Morimoto on Oct. 27, 1981 for "Combustion Method for Reducing NOx and Smoke Emission" (hereafter the "Morimoto Patent") disclosed a combustion method which can reduce the emission of NOx and smoke, by adopting a specific flow pattern of fuel and combustion air in the combustion chamber, which pattern was obtained as a result of studies and experiments concerning the influence of the intensity of mixing of the fuel and the combustion air on the emission of NOx.

3. U.S. Pat. No. 4,657,504 issued to Akiyama on Apr. 14, 1987 for "Combustion Burner" (hereafter the "Akiyama Patent") disclosed a burner assembly of a type wherein both the combustion air and gaseous fuel are controlled by a pressure equalizing control device which has an inner barrel and a combustion air preheating passage both arranged exteriorly of a gaseous fuel supply tube, an annular space defined exteriorly of the gaseous fuel supply tube and communicating with the preheating passage through at least one perforation in the inner barrel, and an exhaust passage provided with an preheating passage.

4. U.S. Pat. No. 5,180,300 issued to Hovis on Jan. 19, 1993 for "Low NOx Regenerative Burner" (hereafter the "Hovis Patent") disclosed a regenerative burner having heat storage units with combustion effluent/combustion air ducts there through, fuel intake means and a burner body, wherein the burner is designed to suppress NOx formation and to control flame shape and characteristic in the regenerative system during combustion. The regenerative burner may include a burner baffle, or may include a plurality of gas jets entrained in generally converging fashion for control of the flame characteristics and shape dispositive of NOx formation. The burner may provide for staged combustion, either by means of sequential fuel injection or sequential provision of combustion air, or the burner may depress NOx formation by vitiation of combustion air with products of combustion. The present regenerative burners suppress NOx formation yet preserve the remaining characteristic features of regenerative systems.

5. U.S. Pat. No. 5,359,966 issued to Jensen on Nov. 1, 1994 for "Energy Converter Using Imploding Plasma Vortex Heating" (hereafter the "Jensen Patent") disclosed a heating system for heating a heat sink via a heat transfer medium. The invention includes a vortex chamber having opposite first and second inwardly curved end walls, a combustion chamber fluidly communicating with the vortex chamber, air-fuel supply means fluidly communicating with the combustion chamber for injecting air-fuel mixture into the combustion chamber. Ignition means are provided in the combustion chamber for igniting the air-fuel mixture. A fuel ionizing chamber is disposed in the vortex chamber fluidly communicating with the air-fuel supply means for ionizing fuel entering the air-fuel supply means, and heat transfer medium containing means are provided for holding the heat transfer medium in thermal contact with the vortex chamber.

6. U.S. Pat. No. 5,411,394 issued to Beer on May 2, 1995 for "Combustion System For Reduction Of Nitrogen Oxides" (hereafter the "Beer Patent") disclosed a low NOx burner for the combustion of gaseous, liquid and solid fuels. The fluid dynamic principle of radial stratification by the combustion of swirling flow and a strong radial gradient of the gas density in the transverse direction to the axis of flow rotation is used to damp turbulence near the burner and hence to increase the residence time of the fuel-rich pyrolyzing mixture before mixing with the rest of the combustion air to effect complete combustion.

7. U.S. Pat. No. 5,460,513 issued to Flanagan on Oct. 24, 1995 for "Low NOx Burner" (hereafter the "Flanagan Patent") disclosed a burner structure and a method of operating a burner to reduce the pollutant emissions produced thereby are disclosed. Air and gas are premixed in a manner such that a substantially homogeneous mixture containing excess combustion air results. The velocity of the substantially homogeneous mixture is increased as it passes through the burner causing the "residence time" associated with the formation of the flame to be decreased, i.e., the combustion gases are in the reaction zone of the flame for a significantly shorter period of time, reducing the production of NOx. In order to prevent the flame from "lifting-off" the burner because of the high velocity of the substantially homogeneous air/gas mixture, flame stabilizing devices and/ or a burner structure which provides flame stabilization are utilized.

8. U.S. Pat. No. 5,846,067 issued to Nishiyama on Dec. 8, 1998 for "Low-NOx Burner" (hereafter the "Nishiyama Patent") disclosed a low-NOx burner that is effective for reduction in NOx in a mid-temperature range which has been conventionally difficult to be realized and improves stability of the flame. In the low-NOx burner, at an outlet of an air throat for flowing a full quantity of the combustion air is disposed a burner tile having an enlarged diameter portion thereof whose diameter is larger than that of the outlet, and a fuel nozzle for injecting the fuel from the enlarged diameter portion of the burner tile is also provided. Further, a flow of the combustion air injected from the air throat produces a negative pressure at a secondary combustion chamber surrounded by the enlarged diameter portion of the burner tile around the air throat to cause a strong furnace exhaust gas recycle to occur, and a flame holding area, a furnace exhaust gas recycle combustion area and a slow combustion area are formed.

9. U.S. Pat. No. 5,861,600 issued to Jensen on Jan. 19, 1999 for "Fuel Plasma Vortex Combustion System" (hereafter the "First Jensen Patent") disclosed a combustion system having a combustion chamber. The combustion chamber has a fuel inlet, a preheating chamber surrounding the combustion chamber, an air inlet for tangentially feeding combustion air to the preheating chamber, the combustion chamber having an elongated slot for tangentially admitting preheated air in circulating motion to the combustion chamber, a plasma chamber coupled to the combustion chamber having an inlet aperture for receiving combusting air-fuel plasma from the combustion chamber, and an outlet aperture for expelling combusted gas, the plasma chamber having an inverted end wall surrounding the outlet aperture operative for forming an imploding vortex in the plasma chamber.

10. U.S. Pat. No. 5,944,507 issued to Feldermann on Aug. 31, 1999 for "Oxygen/Oil Swirl Burner" (hereafter the "Feldermann Patent") disclosed a liquid fuel burner that is provided with a central fuel outlet having a generally divergent conical inner surface, formed of two contiguous divergent conical surfaces of different angles of divergence, and a plurality of oxygen outlets shaped and positioned for creating a converging, rotating stream of oxygen which intersects with any liquid fuel issuing from the fuel outlet. Such oxygen/fuel interaction results in two zones of combustion and a recirculation effect which assists in the complete or substantially complete combustion of undesirable exhaust gas components. The oxygen and fuel are preferably supplied such that their velocities are approximately equal at the point at which the two zones of combustion meet. However, the Felderman Patent does not teach that the fluid streams must impinge and quickly mix or that the fluids must be preheated such that the initial temperature is above the autoignition temperature of the mixture. Rather, the Felderman Patent teaches a type of swirl-type mixing that depends upon adequate flame propagation throughout the mixture to complete combustion, a process inadequate or impossible in mixtures close to or beyond the flammable limit.

11. U.S. Pat. No. 5,961,312 issued to Sugiyama on Oct. 5, 1999 for "Combustion Burner and Combustion Method thereof in Furnace" disclosed a combustion burner that comprises: an air supply passage for supplying an air to a heating furnace; a primary fuel nozzle for supplying an air to a heating furnace; a primary fuel nozzle for supplying a primary fuel to the air supply passage; secondary fuel nozzles arranged around the air supply port of the air supply passage; and the secondary fuel nozzles being arranged so that a distance from an outer periphery of the air supply port to the outer periphery of the secondary fuel supply port is larger than the diameter of the air supply port. It also disclosed a combustion method that includes the steps of injecting fuel substantially from the primary fuel nozzle when an in furnace temperature of the heating furnace is lower than a fuel ignition temperature, and injecting fuel substantially from the secondary fuel nozzle when an in furnace temperature of the heating furnace is higher than a fuel ignition temperature.

12. U.S. Pat. No. 5,968,378 issued to Jensen on Oct. 19, 1999 for "Fuel Plasma Vortex Combustion System" (hereafter the "Second Jensen Patent") disclosed a combustion system having a combustion chamber having a fuel inlet, a preheating chamber surrounding the combustion chamber, an air inlet for tangentially feeding combustion air to the preheating chamber, the combustion chamber having an elongated slot for tangentially admitting preheated air in circulating motion to the combustion chamber, a plasma chamber coupled to the combustion chamber having an inlet aperture for receiving combusting air-fuel plasma from the combustion chamber, and an outlet aperture for expelling combusted gas, the plasma chamber having an inverted end wall surrounding the outlet aperture operative for forming an imploding vortex in the plasma chamber.

13. U.S. Pat. No. 5,984,667 issued to Philippe on Nov. 16, 1999 for "Combustion Process and Apparatus therefore Containing Separate Injection of Fuel and Oxidant Streams" (hereafter the "Philippe Patent") discloses a burner assembly having improved flame length and shape control which includes in exemplary embodiments at least one fuel fluid inlet and at least one oxidant fluid inlet, means for transporting the fuel fluid from the fuel inlet to a plurality of fuel outlets, the fuel fluid leaving the fuel outlets in fuel streams that are injected into a combustion chamber, means for transporting the oxidant fluid from the oxidant inlets to at least one oxidant outlet, the oxidant fluid leaving the oxidant outlets in oxidant fluid streams that are injected into the combustion chamber, with the fuel and oxidant outlets being physically separated, and geometrically arranged in order to impart to the fuel fluid streams and the oxidant fluid streams angles and velocities that allow combustion of the fuel fluid with the oxidant in a stable, wide, and luminous flame. The burner assembly affords improved control over flame size and shape and may be adjusted for use with a particular furnace as required.

It appears that none of above cited prior art references specifically teaches the special operating conditions necessary for stable operation under very fuel-rich or very fuel-lean conditions. Nor do any of the above cited prior art references teach that the temperature and density of the combustion products are strong functions of the ratio of those reactants, under those extreme combustion conditions. Neither does any of the above cited prior art references teach the strong negative impact this can have on combustion stability.

Moreover, it appears that the above cited prior art references are designed to burn air-fuel mixtures very close to stoichiometric, and none has addressed the challenges of burning fuel with an oxidizer under the difficult combustion conditions of very fuel-rich and fuel-lean mixtures. As a result, none of the above cited prior art references recognizes the need to create a sound, solidly anchored flame and stable combustion under conditions which may be very close to or even beyond the flammable limit for those mixtures.

SUMMARY OF THE INVENTION

The present invention is an air-fuel injection method and system for stable combustion.

It is an object of the present invention to provide an air-fuel injection method and system for very fuel-rich or fuel-lean initial combustion as required for preventing formation of NOx and SOx during combustion.

It is another object of the present invention to provide an air-fuel injection method and system for very fuel-rich or fuel-lean initial combustion sometimes beyond the rich and lean flammable limits.

It is a further object of the present invention to provide an air-fuel injection method and system for rapid, intimate mixing of the combustion fuel and air to provide solid flame-anchoring in fuel combustors.

It is also an additional object of the present invention to provide an air-fuel injection method and system with dynamic design to achieve stable combustion in fuel combustors.

Described generally, the present invention is an air-fuel injection method for providing stable ignition and combustion under very fuel-rich or fuel-lean conditions where the air/fuel ratio is very close to or beyond the flammable limits. The method includes the steps of preheating combustion reactants such that their mixture is at a uniform temperature above the auto-ignition temperature of the mixture, injecting the combustion reactants such that their streams directly impinge form a uniform and intimately mixed mixture, and controlling pressure drops and flow inertances of the combustion reactants such that the pressure drop and flow inertance of the stoichoimatically less abundant reactant are higher than the pressure drop and flow inertance of relatively more abundant reactant. This method provides stable ignition and combustion under the very fuel-rich or fuel-lean conditions that facilitate the prevention of NOx and SOx formation during combustion.

Described alternatively, the present invention is an air-fuel injection system for a combustor to provide stable ignition and combustion under very fuel-rich or fuel-lean conditions where the air/fuel ratio is very close to or beyond the flammable limits. The system includes means for preheating combustion reactants such that their mixture is at a uniform temperature above the auto-ignition temperature of the fuel, orifices for injecting the combustion reactants such that their streams directly impinge and form a uniform and intimately mixed mixture, and means for controlling pressure drops and flow inertances of the combustion reactants such that the pressure drop and flow inertance of the stoichoimatically less abundant reactant are higher than the pressure drop and flow inertance of the more abundant reactant. This system provides stable ignition and combustion under the very fuel-rich or fuel-lean conditions that facilitate the prevention of NOx and SOx formation during combustion.

The present invention air-fuel injection method and system has many advantages. The main advantages of the present invention includes the rapid, intimate mixing of the combustion fuel and air to provide solid flame-anchoring and the stable combustion in fuel combustors. The present invention air-fuel injection method and system maintains stable ignition and avoids lift- or blow-off of the flame, and prevents unstable response to or coupling with pressure fluctuations in the combustor, under the very fuel-rich or fuel-lean initial combustion conditions (sometimes beyond the rich or lean flammable limits) which is required for preventing NOx and SOx formation during combustion.

Further novel features and other objects of the present invention will become apparent from the following detailed description, discussion and the appended claims, taken in conjunction with the drawing.

BRIEF DESCRIPTION OF THE DRAWING

Referring particularly to the drawing for the purpose of illustration only and not limitation, there is illustrated.

DETAILED DESCRIPTION OF THE PREFERRED EMBODIMENTS

Figure 1:
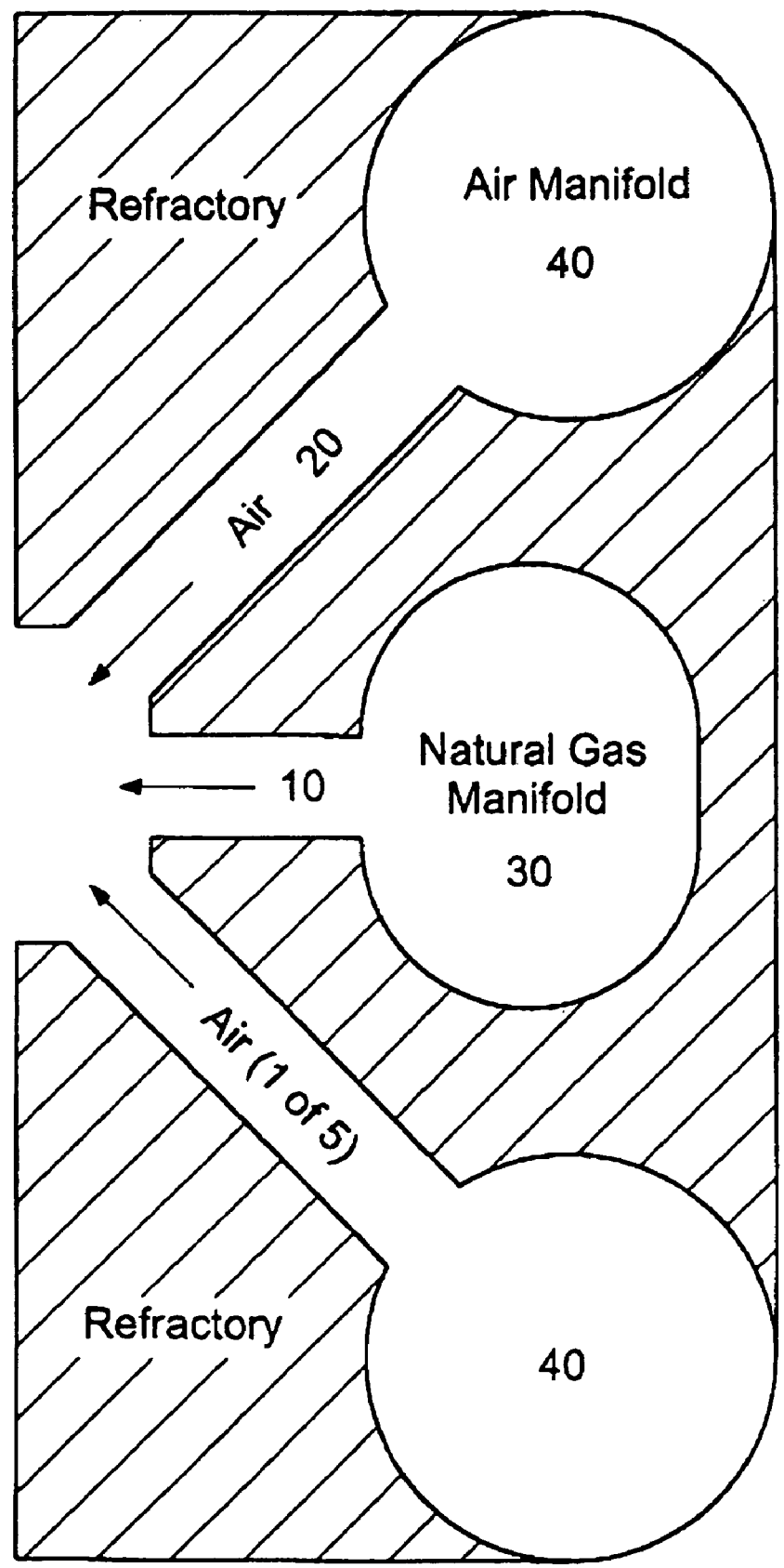
FIG. 1 is a schematic diagram showing one of the preferred embodiments of the present invention air-fuel injection method and system for stable combustion.

Although specific embodiments of the present invention will now be described with reference to the drawing, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

A. Combustion Conditions

The prevention of NOx and SOx formation during combustion requires the initial combustion to be very fuel-rich or very fuel-lean, sometimes beyond the rich and lean flammable limits. This in turn requires strict combustion conditions to maintain stable ignition and avoid lift- or blow-off of the flame, and prevent unstable response to or coupling with pressure fluctuations in the combustor. These two critical combustion conditions will be discussed in detail below.

1. Stable Ignition

Most fossil fuel injection systems depend on flame propagation to spread the flame throughout a combustible mixture. Usually, air and fuel are first mixed together, forming a more or less combustible mixture, and then an ignition source is provided. That flame must then propagate throughout the combustible mixture.

For example, in a carbureted gasoline engine, fuel vapor is first mixed into the combustion air and that combustible mixture is then directed into the engine cylinder. A spark plug then provides an ignition source, and a flame must propagate throughout the cylinder. If the air and fuel are not uniformly mixed throughout the cylinder there may be regions where the mixture is too fuel-rich or-lean for the flame to penetrate. Uniform mixing becomes critical if the overall mixture is near the fuel-rich or -lean limits for flame propagation.

In a typical coal-fired boiler, the air and fuel are blown separately into the combustion chamber and the air is strongly swirled. The swirl mixes the fuel and air together, to form a more or less combustible mixture. At the same time the swirl creates a low pressure immediately in front of the burner. This draws some of the hot, burning gases back up to the burner, providing a steady ignition source, on the inside of the swirling mixture. That flame must then propagate throughout the surrounding, swirling combustible mixture.

The above described process is commonly known as "swirl stabilization". Normally it is adequate to provide stable, continuous ignition and to prevent flame lift off. However, complete combustion of the injected fuel depends upon propagation of that initial flame throughout the combustible mixture. When that mixture is very fuel-rich the resulting combustion is relatively cool and the speed of flame propagation is greatly reduced, in some cases even to zero. The initial flame can be quenched before it can reach and ignite all of the fuel. Under very fuel-rich conditions a swirl stabilized flame frequently becomes unstable and the flame lifts off, with subsequent complete loss of ignition.

The injection scheme described herein involves preheating of the combustion air, by means not a part of this invention, followed by complete, rapid and intimate mixing, via direct impingement, of that high temperature combustion air with the fuel. The injection orifices or ducts are sized and operated to provide rapid and optimum mixing of the impinging streams, using an empirical, dimensionless correlating parameter (not a part of this invention) known as the "velocity head ratio". The result is a well-stirred, uniformly mixed combustible mixture at temperatures above the autoignition temperature for that fuel. There are no excessively fuel-rich or -lean regions and every bit of fuel is surrounded by the necessary combustion air, at high temperature. There is no need for flame propagation, only for chemical reaction.

2. Stable Combustion

A combustion air feed system, such as in a fossil fuel-fired boiler, is usually driven by a forced-draft fan. In a pulverized coal-fired combustion system the coal is carried into the combustion in a separate carrier air stream. To minimize parasitic energy losses, pressure drops through both feed systems are set as low as possible. However, in natural gas systems, the gas-side feed system pressure drops are sometimes quite high.

If, for some reason, a pressure perturbation or overpressure occurs in the combustion chamber, it will momentarily reduce the injection pressure drops and slow the flow of both air and fuel into the furnace. The reduced flow rates then cause a subsequent reduction in chamber pressure, which in turn causes the air and fuel flows to increase, which causes another chamber overpressure, and so on. This is a simple description of feed system-coupled combustion instability.

If the air/fuel ratio is near stoichiometric, and especially if both air and fuel flows respond to pressure variations to the same degree, the coupling is almost totally between pressure oscillations in the furnace and the resulting oscillations in the total flow rates into the furnace. In fossil-fueled boilers, oscillations of this type are not usually severe, perhaps just amounting to a low frequency vibration or rumble.

However, when operating under very fuel-rich or very fuel-lean conditions, the combustion gas temperature and density are strong functions of the injected air-fuel ratio, and feed system coupling can result from pressure coupling with both flow rate and with mixture ratio variations. For example, in a natural gas-fueled system, the gas feed system pressure drop might be quite high while that of the air flow feed system is low. In such a case, an overpressure would tend to slow the flow of air more than that of the fuel. As a result, the air-fuel mixture ratio would become even more fuel-rich.

If the system was already running very fuel-rich, for example to control NOx, that ratio could momentarily become so fuel-rich as to flame out. In any case, the combined coupling of pressure with both total flow rates and with the ratio of those rates can be much more severe, even triggering destructive feed system-coupled combustion instability.

This is usually what terminates experiments conducted to investigate the effects of very fuel-rich combustion on NOx and SOx formation.

As the mixture is made more and more fuel-rich, measured NOx and SOx emissions both continue to decline, but then the flame lifts off or the system goes unstable before the emissions become very low. To provide ultimate NOx/SOx control by this method, then, it must be possible to run stably under very fuel-rich conditions.

The same is true when operating under very fuel-lean conditions. Again, if the gas feed system pressure drop is quite high while that of the air feed system is low, an overpressure in the combustor will slow the air flow rate more than the fuel flow rate and the mixture will become more fuel-rich. In this fuel-lean case that is the desired condition for stable combustion.

To be able to run stably under very fuel-rich or fuel-lean conditions, it is necessary to design the response of the injection system such that, even though a combustion chamber overpressure will cause a reduction in the total flow rate into the combustor, it will at the same time cause the mixture ration to move closer to stoichiometric. In such a case the higher temperature, more reactive combustion will tend to compensate for the reduction in the total flow, and minimize the net pressure response. This is what is achieved by the present invention air-fuel injection method and system described herein.

In addition to designing air-and fuel-side pressure drops to provide low frequency stability it is equally important to design the dynamics of the injection system such that it is stable to higher frequency perturbations and/or combustor resonances as well. The injection system described herein provides high inertia orifices for that fluid that should remain as constant as possible and low inertia orifices for that fluid that should respond more strongly, such that an overpressure in a higher frequency resonance creates a compensating shift in the air-fuel mixture toward stoichiometric. In the fuel-rich case it is the air orifices that are designed with high inertance and the fuel orifices that are low. Appropriate design is opposite in the fuel-lean case. Accordingly, the two basic design features disclosed herein are: (1) the system for rapid, intimate mixing of the combustion air and fuel, to provide solid flame-anchoring; and (2) the dynamic design to provide stable combustion.

B. Design Examples

One example of the present invention injector design disclosed herein is implemented in a natural gas-fired industrial boiler to achieve very fuel-rich condition in the first stage of combustion, to minimize formation of NOx. A schematic of the basic design embodiment is shown in FIG. 1.

In the fuel-rich injector design described herein, at least three (3) air-fuel feed system criteria are addressed: (1) to keep the air-side pressure drop as high as practical; (2) to keep the fuel-side pressure drop lower than the air-side drop; and (3) to design the air-side with long, narrow, high inertia ducts and the fuel-side with short, squat, low inertia ducts, both ducts closely connected to large, compressible manifolds. Criteria (1) is to minimize total flow rate response while (2) and (3) are to cause the mixture ratio response to overpressures to be toward stoichiometric.

1. Mixing

The air-fuel mixing technique disclosed here involves direct impingement of the two fluids. The design of the controlling orifices for rapid, uniform mixing of the air and fuel is based on an empirical correlating expression, called the velocity head ratio, long in use in the liquid propellant rocket engine industry but never applied to coal and natural gas fuels except by this inventor.

An appropriate first stage stoichiometric ratio for low NOx operation is about 0.52. Under those conditions, the air-to-fuel ratio of weight flow rates is 8.3. Preheating the combustion air to 1500° F. results in fuel-to-air density ratio of 2.2. Empirical data indicate that, for optimum mixing, the individual orifice areas should be approximately the same, and the appropriate empirical velocity head ratio should be around 3.3. Inserting these values into the velocity head ratio correlation, the optimum ratio of fuel-to-air orifice areas is 0.15. This means that there must be a single, central fuel orifice 10 surrounded by up to seven (7) air orifices 20. A more practical design might involve four (4) or five (5) air orifices 20 in which the diameter of the central fuel orifice 10 is 77% and 86%, respectively, of the diameters of the surrounding air orifices 20. The example design shown in FIG. 1 is based on four (4) air orifices 20.

2. Stable Combustion

For low frequency stability, the air orifice pressure drop should be as high as practical for the application and the fuel-side pressure drop should be lower than that of the air-side. For natural gas fuels operating under these very fuel-rich conditions, dynamic feedback control system analysis indicates that the pressure drop across the air orifices 20 should be about three times that across the central fuel orifice 10. With this design a combustion chamber over-pressure will reduce the flows of both air and fuel but will reduce the fuel flow more than the air flow, thereby causing the air/fuel mixture ratio and temperature to increase, and to offset the reduction in total flow.

In addition, the length/diameter ratio (reflecting inertance) of the inside, the fuel orifice 10 should be relatively small while those of the outside, air orifices 20 should be relatively large. From the dynamic analysis mentioned above, the inertance of each air orifice 20 should be slightly more than twice that of the fuel orifice 10. All orifices can be fed from reasonably large, compressible manifolds. This arrangement will provide greater fuel than air response to short term dynamic (higher frequency) pressure variations.

These requirements essentially dictate an orifice configuration as shown in FIG. 1. The fuel manifold 30 is closer in and the inside, fuel orifice 10 that feeds from it is short. The air manifold 40 sits outside of the fuel manifold and the air orifices 20 it feeds are about twice as long as the fuel orifice. Both manifolds can be fed in a variety of ways, and such feed is not part of this disclosure.

In a preferred embodiment, the appropriate flow-controlling orifice configuration and operating conditions may be determined through an expression known as the "velocity head ratio", expressed as the dimensionless ratio:

$$[W_a/W_f]^2 \cdot [G_f/G_a] \cdot [A_f/(n_a A_a)]^2 = B[1]$$

where
  A is the orifice cross-sectional flow area;
  B is a dimensionless empirical constant in the range of 2 to 5;
  G is fluid weight density;
  n is the number of air orifices;
  W is the fluid weight flow rate; and
  subscripts "f" denotes the central, inside fuel orifice;
  subscript "a" denotes the outside air orifices.

In one embodiment, the diameter of the fuel orifice 10 is approximately equal to the diameter of the air orifices 20.

In the example where the fuel is natural gas, the length-to-diameter ratio of the air orifices 20 is about twice that of the length-to-diameter ratio of the central fuel orifice 10.

The advantages of the present invention air-fuel injection method and system includes the rapid, intimate mixing of the combustion air and fuel to provide solid flame-anchoring and the stable combustion in fuel combustors. It also provides stable ignition and avoids lift —or blow-off of the flame, and prevents unstable response to or coupling with pressure fluctuations in the combustor, under the very fuel-rich or fuel-lean initial combustion conditions (sometimes beyond the rich and lean flammable limits) which are required for preventing NOx and SOx formation during combustion.

Defined in detail, the present invention is an air-fuel injection method for providing stable ignition and combustion under very fuel-rich conditions where the air/fuel ratio is very close to or beyond the flammable limit, comprising the steps of: (a) preheating the air such that subsequent mixture is at a uniform temperature above the auto-ignition temperature of the fuel; (b) injecting air and fuel such that their streams directly impinge and form a uniform and intimately mixed mixture; and (c) controlling pressure drops and flow inertances of air and fuel such that the pressure drop and flow inertance of the air are higher than the pressure drop and flow inertance of the fuel. The resulting stable ignition under the very rich fuel-lean conditions facilitate the prevention of NOx formation during combustion.

Defined alternatively, the present invention is an air-fuel injection method for providing stable ignition and combustion under very fuel-lean conditions where the air/fuel ratio is very close to or beyond the flammable limit, comprising the steps of: (a) preheating the air such that the subsequent mixture is at a uniform temperature above the auto-ignition temperature of the fuel; (b) injecting air and fuel such that their streams directly impinge and form a uniform and intimately mixed mixture; and (c) controlling pressure drops and flow inertances of air and fuel such that the pressure drop and flow inertance of the fuel are higher than the pressure drop and flow inertance of the air. The resulting stable ignition and combustion under the very fuel-lean conditions facilitate the prevention of NOx formation during combustion.

Defined broadly, the present invention is an air-fuel injection method for providing stable ignition and combustion under very fuel-rich or fuel-lean conditions where the air/fuel ratio is very close to or beyond the flammable limits, comprising the steps of: (a) preheating the combustion air such that the resulting air-fuel mixture is at a uniform temperature above the auto-ignition temperature of the fuel; (b) injecting the combustion reactants such that their streams directly impinge and form a uniform and intimately mixed mixture; and (c) controlling pressure drops and flow inertances of the combustion reactants such that the pressure drop and flow inertance of the stoichoimatically less abundant reactant are higher than the pressure drop and flow inertance of the more abundant reactant. The resulting stable ignition and combustion under very fuel-rich or fuel-lean condition facilitates the prevention of NOx and SOx formation during combustion.

Also defined alternatively, the present invention is an air-fuel injection system for a combustor to provide stable ignition and combustion under very fuel-rich or fuel-lean conditions where the air/fuel ratio is very close to or beyond the flammable limits, comprising: (a) means for preheating the combustion air such that the subsequent air-fuel mixture is at a uniform temperature above the auto-ignition temperature of the fuel; (b) orifices for injecting the combustion reactants such that their streams directly impinge and form a uniform and intimately mixed mixture; and (c) means for controlling pressure drops and flow inertances of the combustion reactants such that the pressure drop and flow inertance of the stoichoimatically less abundant reactant are higher than the pressure drop and flow inertance of relatively more abundant reactant. The resulting stable ignition and combustion under very fuel-rich or fuel-lean condition facilitates the prevention of NOx and SOx formation during combustion.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. An air-fuel injection method for providing stable ignition and combustion under very fuel-rich conditions where the air/fuel ratio is very close to or beyond the flammable limit, comprising the steps of:
    a. preheating air such that a resulting air-fuel mixture is at a uniform temperature above an auto-ignition temperature of a fuel;
    b. injecting air and said fuel respectively through multiple air orifices surrounding a single central fuel orifice such that their streams directly impinge and form a uniform and intimately mixed mixture; and
    c. controlling pressure drops and flow inertances of air and said fuel such that pressure drop and flow inertance of air are higher than pressure drop and flow inertance of said fuel to provide stable ignition and combustion under a very fuel-rich condition where the air/fuel ratio is very close to or beyond the flammable limit.

2. An air-fuel injection method for providing stable ignition and combustion under very fuel-lean conditions where the air/fuel ratio is very close to or beyond the flammable limit, comprising the steps of:
    a. preheating air such that a resulting air-fuel mixture is at a uniform temperature above an auto-ignition temperature of a fuel;
    b. injecting said fuel and air respectively through a single central fuel orifice surrounded by multiple air orifices such that their streams directly impinge and form a uniform and intimately mixed mixture; and
    c. controlling pressure drops and flow inertances of said fuel and air such that pressure drop and flow inertance of said fuel are higher than pressure drop and flow inertance of air to provide stable ignition and combustion under a very fuel-lean condition where the air/fuel ratio is very close to or beyond the flammable limit.

3. An air-fuel injection method for providing stable ignition and combustion under very fuel-rich or fuel-lean conditions where the air/fuel ratio is very close to or beyond the flammable limits, comprising the steps of:
    a. preheating air such that a resulting air-fuel mixture is at a uniform temperature above an auto-ignition temperature of a fuel;
    b. injecting combustion reactants including air and said fuel respectively through multiple air orifices surrounding a single central fuel orifice such that their streams directly impinge and form a uniform and intimately mixed mixture; and
    c. controlling pressure drops and flow inertances of said combustion reactants such that pressure drop and flow inertance of a stoichiometically less abundant reactant are higher than pressure drop and flow inertance of a relatively stoichiometically more abundant reactant to provide stable ignition and combustion under very fuel-rich or fuel-lean conditions where the air/fuel ratio is very close to or beyond the flammable limits.

4. The air-fuel injection method in accordance with claims 1, 2 or 3, wherein said fuel is a hydrocarbon fuel.

5. The air-fuel injection method in accordance with claims 1, 2 or 3, wherein said preheat uniform mixture temperature is approximately equal to the auto-ignition temperature of a stoichiometric mixture of said fuel and air.

6. The air-fuel injection method in accordance with claims 1, 2, or 3, wherein said single fuel orifice and said multiple air orifices are configured to provide both a more steady and stable flow of said stoichiometrically less abundant reactant and a subsequent very rapid and complete mixing of all said combustion reactants in a combustion chamber.

7. An air-fuel injection system for a combustion to provide stable ignition and combustion under very fuel-rich or fuel-lean conditions where the air/fuel ratio is very close to or beyond the flammable limits, comprising:
   a. means for preheating air such that a resulting air-fuel mixture is at a uniform temperature above an auto-ignition temperature of a fuel;
   b. means for injecting combustion reactants including air and said fuel respectively through multiple air orifices and a single central fuel orifice such that their streams directly impinge and form a uniform and intimately mixed mixture; and
   c. means for controlling pressure drops and flow inertances of said combustion reactants such that pressure drop and flow inertance of a stoichiometically less abundant reactant are higher than pressure drop and flow inertance of a relatively stoichiometically more abundant reactant for providing stable ignition and combustion under very fuel-rich or fuel-lean conditions where the air/fuel ratio is very close to or beyond the flammable limits.

8. The air-fuel injection system in accordance with claim 7, wherein said fuel is a hydrocarbon fuel.

9. The air-fuel injection system in accordance with claim 7, wherein said preheat uniform mixture temperature is approximately equal to the auto-ignition temperature of a stoichiometric mixture of said fuel and air.

10. The air-fuel injection system in accordance with claim 7, wherein said single fuel orifice and said multiple air orifices are configured to provide both a more steady and stable flow of said stoichiometrically less abundant reactant and a subsequent very rapid and complete mixing of all of said combustion reactants in a combustion chamber.

* * * * *